United States Patent
MacMillan et al.

(10) Patent No.: US 10,691,889 B2
(45) Date of Patent: *Jun. 23, 2020

(54) EMAIL SUGGESTOR SYSTEM

(71) Applicant: Groupon, Inc., Chicago, IL (US)

(72) Inventors: Evan MacMillan, Los Altos Hills, CA (US); Gaston L'Huillier, San Francisco, CA (US); Sebastian Kreft, San Francisco, CA (US); Francisco Larrain, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,496

(22) Filed: Oct. 30, 2018

(65) Prior Publication Data

US 2019/0205374 A1  Jul. 4, 2019

Related U.S. Application Data

(63) Continuation of application No. 15/443,556, filed on Feb. 27, 2017, now Pat. No. 10,146,766, which is a continuation of application No. 14/958,423, filed on Dec. 3, 2015, now Pat. No. 9,606,982, which is a continuation of application No. 13/744,141, filed on Jan. 17, 2013, now Pat. No. 9,223,774.

(Continued)

(51) Int. Cl.
| | |
|---|---|
| *G06F 40/274* | (2020.01) |
| *G06F 16/28* | (2019.01) |
| *G06Q 30/02* | (2012.01) |
| *G06Q 20/24* | (2012.01) |
| *G06Q 20/40* | (2012.01) |

(52) U.S. Cl.
CPC ......... *G06F 40/274* (2020.01); *G06F 16/284* (2019.01); *G06Q 20/24* (2013.01); *G06Q 20/401* (2013.01); *G06Q 20/409* (2013.01); *G06Q 30/0201* (2013.01)

(58) Field of Classification Search
CPC ..... G06F 16/284; G06F 17/276; G06Q 20/24; G06Q 20/401; G06Q 20/409
See application file for complete search history.

(56) References Cited

U.S. PATENT DOCUMENTS

5,950,200 A  9/1999  Sudai et al.
6,651,217 B1  11/2003  Kennedy et al.
(Continued)

*Primary Examiner* — Richard L Bowen
(74) *Attorney, Agent, or Firm* — Alston & Bird LLP (57) ABSTRACT

The email suggestor system and method provide an efficient and effective way to capture a user identifier, such as an email address of a consumer in a retail environment. The email suggestor system generates one or more suggested first text portions based on input data, outputs at least one of the suggested first text portions, and receives a selection of a first text portion. The email suggestor system generates one or more suggested second text portions of a user identifier based on the input data, outputs at least one of the suggested second text portions, and receives a selection of a second text portion. The email suggestor system generates a user identifier including the selected first text portion and the selected second text portion. The email suggestor system uses received feedback response to refine and/or train one or more models with which it generates the suggested text portions.

21 Claims, 7 Drawing Sheets

Related U.S. Application Data

(60) Provisional application No. 61/587,516, filed on Jan. 17, 2012.

(56) References Cited

U.S. PATENT DOCUMENTS

| | | |
|---|---|---|
| 7,216,292 B1 | 5/2007 | Snapper et al. |
| 7,333,976 B1 | 2/2008 | Auerbach et al. |
| 7,343,551 B1 | 3/2008 | Bourdev |
| 8,171,001 B2 | 5/2012 | Roth et al. |
| 8,234,561 B1 | 7/2012 | Bourdev |
| 8,484,573 B1 | 7/2013 | Zhai et al. |
| 8,577,731 B1 | 11/2013 | Cope et al. |
| 8,601,019 B1 | 12/2013 | Weininger et al. |
| 8,645,825 B1 | 2/2014 | Cornea et al. |
| 2002/0013728 A1* | 1/2002 | Wilkman ............... G06Q 30/02 705/14.53 |
| 2003/0115280 A1 | 6/2003 | Quine et al. |
| 2006/0035632 A1 | 2/2006 | Sorvari et al. |
| 2006/0229996 A1 | 10/2006 | Keithley et al. |
| 2008/0126172 A1 | 5/2008 | Melamed |
| 2010/0100434 A1 | 4/2010 | Sock |
| 2010/0274887 A1 | 10/2010 | Sanghavi |
| 2010/0312837 A1 | 12/2010 | Bodapati et al. |
| 2011/0180598 A1* | 7/2011 | Morgan ................. G06Q 20/02 235/380 |
| 2011/0307455 A1 | 12/2011 | Gupta et al. |
| 2013/0086081 A1 | 4/2013 | Schonfeld et al. |
| 2013/0151539 A1 | 6/2013 | Shi et al. |

\* cited by examiner

EMAIL SUGGESTOR SYSTEM

CROSS-REFERENCE TO RELATED APPLICATION

This application is a continuation of U.S. application Ser. No. 15/443,556, filed Feb. 27, 2017, which is a continuation of U.S. application Ser. No. 14/958,423, filed Dec. 3, 2015, now issued U.S. Pat. No. 9,606,985 issued Mar. 28, 2017, which is a continuation of U.S. application Ser. No. 13/744, 141, filed Jan. 17, 2013, now U.S. Pat. No. 9,223,774, issued Dec. 29, 2015, which claims priority to and the benefit of U.S. Provisional Application No. 61/587,516, filed Jan. 17, 2012, the entire contents of each are hereby incorporated by reference in their entirety.

TECHNICAL FIELD

The present description relates to an efficient and effective way to capture consumer contact information. This description more specifically relates to improving the consumer experience and minimizing the transaction time to capture a consumer's email username and domain name by a merchant in a retail environment.

BACKGROUND

Merchants typically wish to obtain a consumer's e-mail address. One way to obtain the e-mail address is to rely on the consumer to input the address. However, the consumer may find inputting the e-mail address tedious and inconvenient. Another way to obtain the e-mail address is to have the merchant input the address. Again, this approach is subject to problems. The merchant must process the transaction and obtain the e-mail address, leading to errors in the spelling of the consumer's email username and domain. In this way, current systems to input email addresses in a retail environment are inefficient and prone to error. Current applications and systems do not provide a way to minimize the transaction time for acquiring (e.g., capturing or entering through an interface) the consumer's email address and the related domain name. Poorly designed applications and systems used to capture consumer information (e.g., email username and domain) do nothing to decrease the transaction time that results in a retail environment. Errors and delays in capturing (e.g., entering) consumer's email username and domain name result from poorly designed applications, cumbersome placement of data capture devices (e.g., inadequate user interfaces, small screen, keyboard) used by the merchants in a retail environment.

BRIEF SUMMARY

The suggestor system provides an effective and efficient way to capture a user identifier (e.g., for a computer system), such as an email address of a consumer in a retail environment.

In one example embodiment, a method for generating a user identifier is provided. The method receives input data, generates one or more suggested first text portions based on the input data, outputs at least one of the suggested first text portions, and receives an indication of a selection of a selected first text portion. In this embodiment, the method further generates, by a processor, one or more suggested second text portions based on the input data, outputs at least one of the suggested second text portions, receives an indication of a selected second text portion, and generates the user identifier based on the selected first text portion and the selected second text portion.

In one embodiment, the selected first portion comprises a username, the selected second portion comprises a domain name, and the user identifier comprises an email address. In another embodiment, generating the one or more suggested first text portions includes receiving additional input data, and updating the one or more suggested first text portions based on the additional input data. In this embodiment, the additional input data may comprise one or more letters of a text portion. In another embodiment, generating the one or more suggested second text portions includes receiving additional input data, and updating the one or more suggested second text portions based on the additional input data. In this embodiment, the additional input data may comprise one or more letters of a text portion. In another embodiment, the one or more suggested second text portions are further based on the indication of a selection of a first text portion. In a further embodiment, outputting at least one of the suggested first text portions includes calculating a probability of selection of each suggested first text portion, generating a rank-ordered list of at least one of the suggested first text portions, the list ranked by probability of selection, and outputting the rank-ordered list. In yet another embodiment, outputting the second text portions includes calculating a probability of selection of each suggested second text portion, generating a rank-ordered list of at least one of the suggested second text portions, the list ranked by probability of selection, and outputting the rank-ordered list. In another embodiment, the suggested first text portions and the suggested second text portions are generated using one or more statistical models. In this embodiment, the method may further train one or more of the statistical models by collecting information regarding the one or more statistical models. In this case, the information may include received feedback, or click-stream information that identifies parts of a graphical user interface a user has clicked on during generation of the user identifier. In this embodiment, the method may calculate performance indicators based on the received information, and update one or more of the statistical models based on the calculated performance indicators. In some embodiments, the method may store the user identifier in a memory. In another embodiment, the input data may include a first name, a last name, geographical information (zip code, address, longitude-latitude coordinates), an age, a gender, a type of credit card, or a bank.

In another example embodiment, an apparatus for generating a user identifier is provided that includes at least one processor and at least one memory including program code, the at least one memory and the computer program code configured to, with the at least one processor, cause the apparatus to receive input data, generate one or more suggested first text portions based on the input data, output at least one of the suggested first text portions, and receive an indication of a selection of a selected first text portion. In this embodiment, the at least one memory and the computer program code are further configured to, with the at least one processor, cause the apparatus to generate one or more suggested second text portions based on the input data, outputs at least one of the suggested second text portions, receive an indication of a selected second text portion, and generate the user identifier based on the selected first text portion and the selected second text portion.

In one embodiment, the selected first portion comprises a username, the selected second portion comprises a domain name, and the user identifier comprises an email address. In another embodiment, generating the one or more suggested first text portions includes receiving additional input data, and updating the one or more suggested first text portions based on the additional input data. In this embodiment, the additional input data may comprise one or more letters of a text portion. In another embodiment, generating the one or more suggested second text portions includes receiving additional input data, and updating the one or more suggested second text portions based on the additional input data. In this embodiment, the additional input data may comprise one or more letters of a text portion. In another embodiment, the one or more suggested second text portions are further based on the indication of a selection of a first text portion. In a further embodiment, outputting at least one of the suggested first text portions includes calculating a probability of selection of each suggested first text portion, generating a rank-ordered list of at least one of the suggested first text portions, the list ranked by probability of selection, and outputting the rank-ordered list. In yet another embodiment, outputting the second text portions includes calculating a probability of selection of each suggested second text portion, generating a rank-ordered list of at least one of the suggested second text portions, the list ranked by probability of selection, and outputting the rank-ordered list. In another embodiment, the suggested first text portions and the suggested second text portions are generated using one or more statistical models. In this embodiment, the at least one memory and the computer program code are further configured to, with the at least one processor, cause the apparatus to train one or more of the statistical models by collecting information regarding the one or more statistical models. In this case, the information may include received feedback, or click-stream information that identifies parts of a graphical user interface a user has clicked on during generation of the user identifier. In this embodiment, the method may calculate performance indicators based on the received information, and update one or more of the statistical models based on the calculated performance indicators. In another embodiment, the selected first portion comprises a username, the selected second portion comprises a domain name, and the user identifier comprises an email address. In some embodiments, the at least one memory and the computer program code are further configured to, with the at least one processor, cause the apparatus to store the user identifier in a memory. In another embodiment, the input data may include a first name, a last name, geographical information (zip code, address, longitude-latitude coordinates), an age, a gender, a type of credit card, or a bank.

In another example embodiment, a computer program product for generating a user identifier is provided that includes at least one non-transitory computer-readable storage medium having computer-executable code portions stored therein, the computer-executable code portions comprising program code instructions that, when executed, cause an apparatus to receive input data, generate one or more suggested first text portions based on the input data, output at least one of the suggested first text portions, and receive an indication of a selection of a selected first text portion. In this embodiment, the program code instructions, when executed, cause the apparatus to generate one or more suggested second text portions based on the input data, outputs at least one of the suggested second text portions, receive an indication of a selected second text portion, and generate the user identifier based on the selected first text portion and the selected second text portion.

In one embodiment, the selected first portion comprises a username, the selected second portion comprises a domain name, and the user identifier comprises an email address. In another embodiment, generating the one or more suggested first text portions includes receiving additional input data, and updating the one or more suggested first text portions based on the additional input data. In this embodiment, the additional input data may comprise one or more letters of a text portion. In another embodiment, generating the one or more suggested second text portions includes receiving additional input data, and updating the one or more suggested second text portions based on the additional input data. In this embodiment, the additional input data may comprise one or more letters of a text portion. In another embodiment, the one or more suggested second text portions are further based on the indication of a selection of a first text portion. In a further embodiment, outputting at least one of the suggested first text portions includes calculating a probability of selection of each suggested first text portion, generating a rank-ordered list of at least one of the suggested first text portions, the list ranked by probability of selection, and outputting the rank-ordered list. In yet another embodiment, outputting the second text portions includes calculating a probability of selection of each suggested second text portion, generating a rank-ordered list of at least one of the suggested second text portions, the list ranked by probability of selection, and outputting the rank-ordered list. In another embodiment, the suggested first text portions and the suggested second text portions are generated using one or more statistical models. In this embodiment, the program code instructions, when executed, cause the apparatus to train one or more of the statistical models by collecting information regarding the one or more statistical models. In this case, the information may include received feedback, or click-stream information that identifies parts of a graphical user interface a user has clicked on during generation of the user identifier. In this embodiment, the method may calculate performance indicators based on the received information, and update one or more of the statistical models based on the calculated performance indicators. In some embodiments, the program code instructions, when executed, cause the apparatus to store the user identifier in a memory. In another embodiment, the input data may include a first name, a last name, geographical information (zip code, address, longitude-latitude coordinates), an age, a gender, a type of credit card, or a bank.

In another example embodiment, an apparatus for generating a user identifier is provided including means for receiving input data, generating one or more suggested first text portions based on the input data, outputting at least one of the suggested first text portions, and receiving an indication of a selection of a selected first text portion. In this embodiment, the apparatus further includes means for generating one or more suggested second text portions based on the input data, outputting at least one of the suggested second text portions, receiving an indication of a selected second text portion, and generating the user identifier based on the selected first text portion and the selected second text portion.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The email suggestor system may be better understood with reference to the following drawings and description.

Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

The email suggestor system collects information through merchant interactions with consumers, and uses the collected information to reduce the transaction time for acquiring e-mail information from the same consumer and/or different consumers during subsequent interactions between the merchant and consumers.

Figure 1:
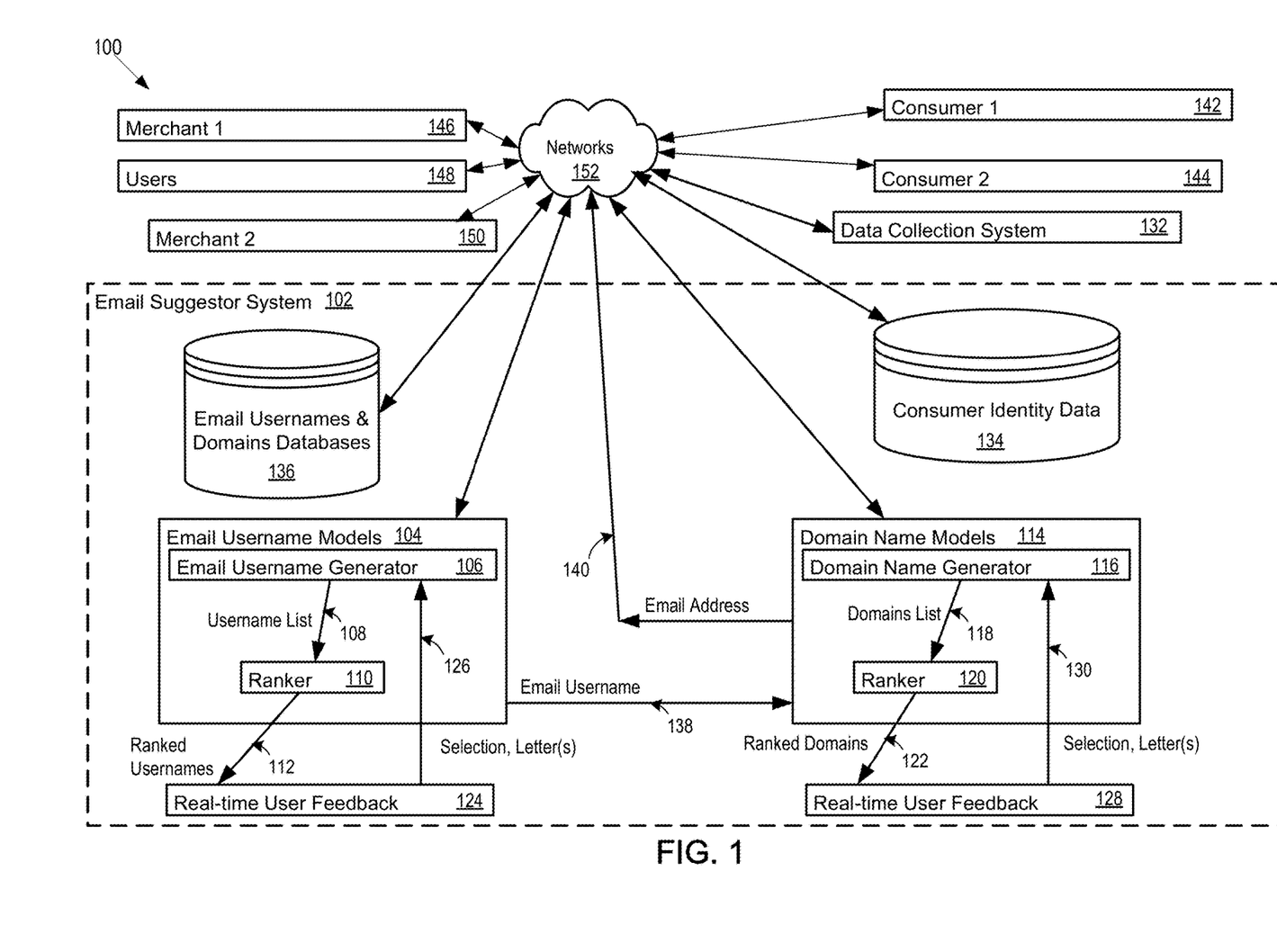
FIG. 1 shows components of the email suggestor system configuration.

FIG. 1 shows components of the email suggestor system configuration 100 that includes an email suggestor system 102. The email suggestor system 102 may include one or more models to generate suggested email addresses. As shown in FIG. 1, email suggestor system includes email username model 104 and domain name model 114. Email username model 104 includes email username generator 106 configured to generate a list of email usernames 108. The domain name model 114 includes a domain name generator 116 configured to generate suggested email domain names 118. Though illustrated in FIG. 1 as a single email username model 104 and domain name model 114, the email suggestor system 102 may include multiple email username models 104 and multiple domain name models 114.

The email suggestor system 102 may generate one or more user identifiers, such as a single suggested email address (such as a single email username followed by the character "@" followed by a domain name) or multiple suggested email addresses. Additionally or alternatively, the user identifier may be a personal identifier. The email suggestor system may also generate a suggested user identifier (e.g., for a computer system) by receiving input data (e.g., user identity data), generating a suggested first portion of the user identifier based on the input data, and generating a suggested second portion of the user identifier based on the input data. The email suggestor system may provide the first and second portions of the user identifier to obtain feedback from a user.

When generating multiple suggested email addresses, the email suggestor system 102 may include functionality to rank the multiple suggested email addresses, such as ranker 110 and ranker 120. For example, a ranker 110 is configured to order the list of email usernames 108 (e.g., ranked according to belief email usernames 112) according to the probability of selection of each email username as determined by the ranker 110. Likewise, ranker 120 is configured to order the list of domain names 118 (e.g., ranked domain names 122) according to the probability of selection of each domain name.

The domain name model 114 may differ in at least one aspect from the email username model 104. As discussed in more detail below, one, some, or all of the following may differ: inputs to the models; logic used for the models (such as the logic used in the email username generator 106 and logic used in the domain name generator); and outputs from the models.

The email username generator 106 and domain name generator 116 may be based on feedback models and may use data from a variety of sources. For example, as illustrated in FIG. 1, the email username generator 106 and the domain name generator 116 use data collected during interaction (124, 126, 128, 130) with the email suggestor system 102, and data received via the data collection system 132, the consumer identity data 134, the email usernames and domain names databases 136, or any combination thereof. As another example, the email username generator 106 and domain name generator may receive consumer identity data, as discussed in more detail below. Examples of consumer identity data include first name, last name, geographical information (zip code, address, longitude-latitude coordinates), age, gender, type of credit card, bank, as well as real-time feedback of an interacting agent (e.g., end-user) including letter(s) identifying a consumer's identity input using an input device. The consumer identity data may be received and/or input in a variety of ways, including using different data collection devices and systems, and devices used by end-users to input text (such as by using a keyboard), to input encoded data (such as from a device configured to read a credit card magnetic stripe), and to input voice (such as by using audio recognition devices).

The interactions (124, 126, 128, 130) include user input of additional data (e.g., one or more letters of an email username or selection of a suggested email username 138, and/or letter or letters of a domain name or selection of a suggested email address 140). Alternatively or in addition, the interactions (124, 126, 128, 130) include consumer input of additional data. Although these interactions are described generally, it will be readily apparent that the mechanics of each interaction is more specific. For example, when receiving a selection, the actual data received by the email username generator 106 or the domain name generator 116 may only include an indication of a selection (e.g., one or more bits of data) transmitted by a user. When interpreted, the indication enables the email username generator 106 or the domain name generator 116 to identify and select a corresponding suggestion.

One or more persons and/or systems may interact with the email suggestor system configuration 100. For example, FIG. 1 illustrates consumers (142, 144), merchants (146, 148), and users 150. The users 150 of the email suggestor system 102 may include the merchants (146, 148) and representatives and agents (e.g., employees) of the merchants), and others interacting with the consumer to capture the consumers' email addresses (e.g., email username and domain name combination). Merchants, users, customers, and consumers may interact with the email suggestor system as end-users. In addition, merchant and user, as used in the examples throughout, may include a person, organization, application, or system(s), or any combination thereof that may use the email suggestor system to capture another person's or entity's email address. The merchants (146, 148) may be affiliated with each other through the use of the email suggestor system 102 so that the consumer identity data 134 and email usernames and domain names databases 136 of the respective merchants (146, 148) and the email suggestor system 102, respectively, may be accessed through a network 152 to increase the amount of information available and improve the accuracy of the email username model 104 and the domain name model 114 used to suggest the consumers' email address. The consumer identity data 134 may include real-time data, as well as a database of past consumer identity data.

The email username generator 106 receives the consumer identity data. In response to receiving the consumer identity data, the email username generator 106 generates an initial list of suggested email usernames. The list of suggested email usernames are ranked according to a probability that the suggested email usernames will be selected, and the rank-ordered list of suggested email usernames is provided to the user.

Generating the suggested email usernames may be an iterative process. The iteration may be triggered in one of several ways. As one example, the user may provide feedback, such as by entering additional input (e.g., one or more letters of the email username) or by selecting one from the ordered list of suggested email usernames. In response to providing the feedback, the email username generator 106 and/or the domain name generator may modify its operation in one or more aspects. For example, when the user provides additional input, the email username generator 106 is configured to generate an updated list of suggested email usernames, which is rank-ordered and provided to the user for selection or additional input. When the user selects an email username from the list of suggested email usernames, the selection is provided to the user and the email username is received by the domain name generator.

The domain name generator is configured to receive one or more inputs, such as the consumer identity data and/or the email username selection from the email user name generator. The domain name generator generates an initial list of suggested domain names. The ranker ranks the list of suggested domain names according to a probability that the domain name will be selected, and the ordered list of suggested domain names are provided to the user. The user may enter additional input (e.g., one or more letters of the domain name) or select from the ordered list of suggested domain names. When the user provides additional input, the domain name generator generates and updated list of suggested domain names, and the list of suggested domain names are rank-ordered and provided to the user for selection or additional input. When the user selects a domain name from the list of suggested domain names, the selection is provided to the user and the consumer identity data is updated to include the email address (e.g., the selected email username and domain name combination).

The email suggestor system 102 updates weights for each possible outcome (e.g., trains the models) in the search space for email username and domain name generation, in order to reduce the likelihood that the searches for suggested email usernames and domain names include possible suggestions that have not been observed over the data. The email suggestor system 102 updates the statistical models for email usernames and domain names generation iteratively, using feedback that may be explicit (e.g., relevance feedback), or implicit (e.g., click-stream information that results from user interaction with the email suggestor system 102). The email suggestor system 102 iteratively evaluates the performance of the statistical models using performance measures.

Figure 2:
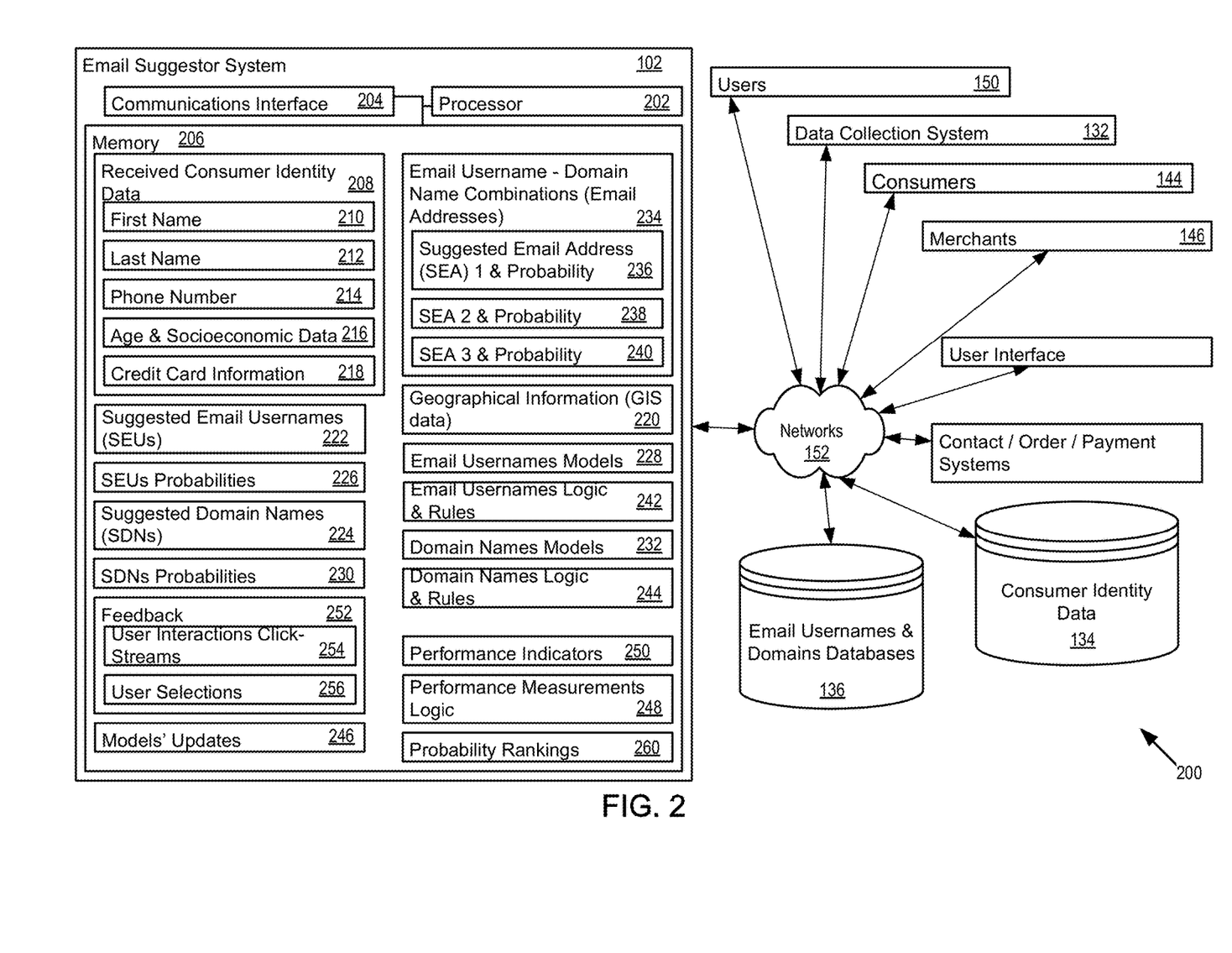
FIG. 2 shows an email suggestor system configuration.

FIG. 2 shows an email suggestor system configuration 200 that includes the email suggestor system 102. The email suggestor system 102 includes a processor 202, a memory 206, and a communications interface 204 through which the email suggestor system 102 is accessible through the network 152. The memory 206 includes received consumer identity data 208 that may include the first name 210 and last name 212 of a consumer (142, 144) and any associated phone number 214, age and socioeconomic data 216, and/or credit card information 218. The email suggestor system 102 may also use geographical information (GIS data) 220 to assist in generating the suggested email usernames 222 and suggested domain names 224. The memory 206 also includes suggested email usernames 222 and corresponding probabilities 226 for each email username generated by the email username generator (email username model 228). The memory 206 also stores suggested domain names 224 and corresponding probabilities 230 for each domain name generated by the domain name generator (domain name model 232). The email suggestor system 102 generates suggested email username and domain name combinations 234, and corresponding probabilities for each email username and domain name combination (236, 238, 240). The email username generator and the domain name generator may each employ the same or different ranker (110, 120) to order the respective suggested lists according to the probability rankings 260 of each suggested email username and suggested domain name. The email suggestor system 102 may use email usernames logic and rules 242, and domain names logic and rules 244 to generate email usernames and domain names, respectively. The email suggestor system 102 trains (e.g., update 246) the models using performance measurement logic 248 to evaluate performance indicators 250, and feedback 252 (e.g., user interactions such as click-streams 254, and user selections 256 of suggested email names and domain names).

Figure 3:
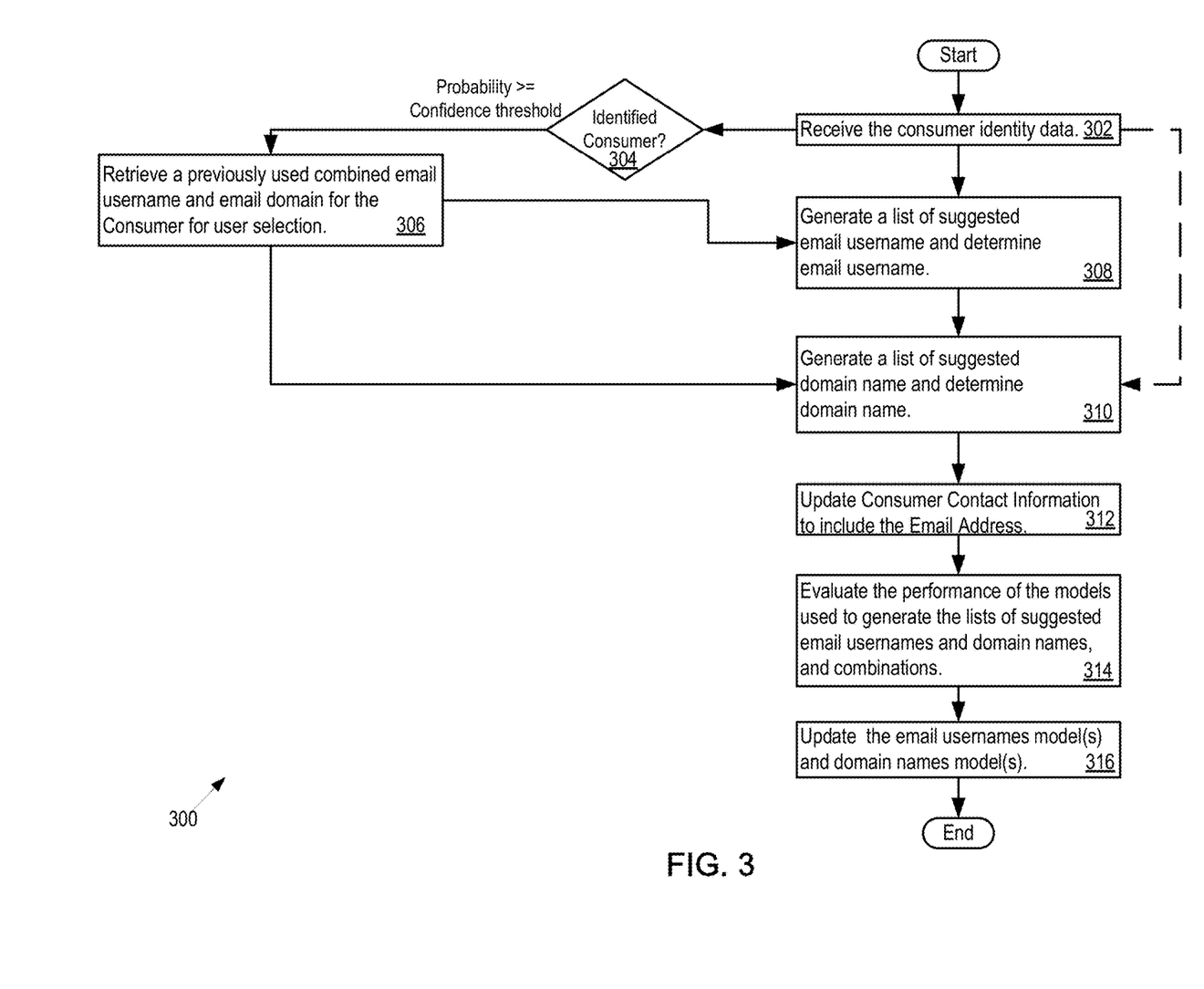
FIG. 3 shows a logic flow of the email suggestor system.

FIG. 3 shows a logic flow 300 of the email suggestor system 102. The email suggestor system 102 includes logic instructions to receive consumer identity data (302). The consumer identity data may include a first name and a last name for the consumer, and/or additional information collected from various sources. The email suggestor system may initially compare the consumer identity data with historical information (e.g., posted and explicit information) to identify the email address of the consumer. When the email suggestor system determines that the historical information identifies the consumer identity with a probability of accuracy greater than a configurable threshold (304), the email suggestor system provides a suggested email address to the user for the consumer (306). The email username generator generates a list of suggested email usernames based on the consumer identity data (308). The domain name generator generates a list of suggested domain names based on the consumer identity data and the inputs from the email username generator (310). The domain name generator generates the suggested email domain differently in at least one aspect from the way the email username generator generates the suggested email username. The email suggestor system provides a combined suggested list of email username and email domain names for user selection, and/or a list of suggested email usernames, and/or a list of suggested domain names (312). The email suggestor system uses additional input from the user to generate an updated list of email usernames, an updated list of domain names and/or an updated list of combinations of email usernames and domain names. These operations may iterate until a user selection is received, selecting one of the suggested usernames, suggested domain names, and/or suggested email addresses (e.g., an email username and domain name combination). When the user selects one of these suggested email usernames, the domain name generator uses the selected email username (among other inputs) to generate a list of domain names. When the user selects one of the email addresses (e.g., an email username and domain name combination), the consumer identity data is updated to include the address. The email suggestor system evaluates the performance of the email username generator and the domain name generator with feedback from the user (e.g., implicit feedback obtained from click-streams that identify user interactions with the email suggestor system, and explicit feedback) (314). The email suggestor system then updates the email usernames model(s) and domain names model(s) based on the feedback (316).

The email username generator generates the suggested email username and calculates a probability value for the suggested email username based on the consumer identity data, geographical information (GIS data) about the consumer identified by the consumer identity data, geographical information about the merchant (e.g., user) interacting with the consumer, or a suggested email domain, or any combination thereof. The domain name generator generates each suggested domain name and calculates a probability value for the suggested domain name.

The email suggestor system may determine, from multiple statistical models, which of the multiple statistical models to use as the email username model, the email domain name model, or both using performance measurements to evaluate each model. Although the email suggestor system may be configured to use the model(s) observed to have the best performance measurements, alternatively the email suggestor system may select one model from the several statistical models available, may select multiple models from the several statistical models available, and/or may aggregate multiple models. For example, the email suggestor system may aggregate multiple statistical models, using for example, information fusion strategies such as borda-count, reciprocal-rank, rank-mixer, rank-booster, among other ranking mixer algorithms. The email suggestor system uses relevance feedback information, or click-stream information that identifies parts of a graphical user interface (GUI) the user clicks on when receiving the consumer identity data, or when receiving the user's selections. The email suggestor system may calculate, for each of the multiple statistical models using performance measures, a performance indicator that indicates the performance of the respective statistical models. The email suggestor system may in turn evaluate the performance indicator of each of the multiple statistical models to determine which of the multiple statistical models to use as the email username model, the email domain names model, or both.

Figure 6:
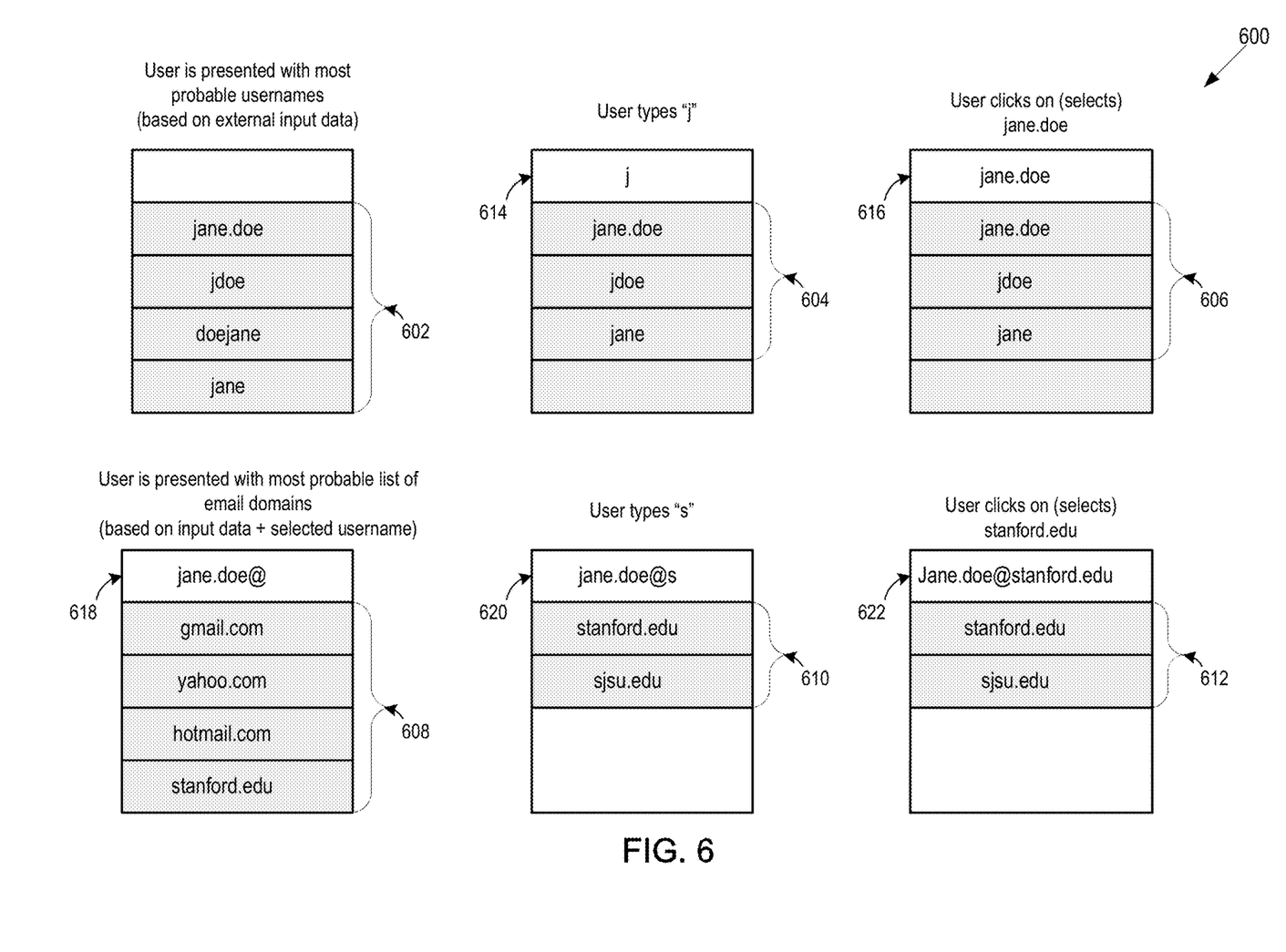
FIG. 6 shows a series of user interface displays of generated suggested email usernames, domain names, and user inputs and selections.

FIG. 6 shows a series of user interface displays 600 of generated suggested email usernames (602, 604, 606), suggested domain names (608, 610, 612), and user inputs (614, 616, 618, 620) and user selection (622). The email suggestor system 102 may generate an initial list of suggested email usernames 602 (e.g., based on external input data such as consumer identity data from a credit card swipe and/or reading the first name and last name of the customer). The ranker 110 ranks the email usernames 602 according to a probability of selection of each suggested email username 602. When the email suggestor system 102 receives user input 614 (e.g., real-time user feedback) the email username generator 106 recalculates the suggested email usernames 604. When the user selects one of the suggested email usernames 606, as the email username 616 (118), the email suggestor system 102 may automatically add the '@' to the end of the email username 618, and the domain name generator 122 generates a list of the most probable email domain names 608 ranked according to a probability of selection of each suggested domain name. When the email suggestor system 102 receives user input 620 (e.g., real-time user feedback, beginning the spelling of the domain name), the domain name generator 122 uses the user input to recalculate the suggested domain names 610. These operations may iterate until the user selects one of the suggested domain names 612, with the email address 622 being captured by the email suggestor system 102.

The email suggestor system 102 may use ranking logic to generate ordered lists of email usernames and domain names ranked by the probability of selection, based on historical information (e.g., posted and explicit information), and the combination of first name and last name. For example, given a first name John and last name Doe, the combination of email usernames may include jdoe, johndoe, john, or doe, each with a probability of selection generated by the email suggestor system logic. Similarly, the email suggestor logic may generate the probability of selection of each domain name. In one embodiment, the email suggestor system logic may generate a list of suggested email addresses (combinations of email usernames and domain names) by searching one or more email username and domain name databases using the first name, last name, GIS data, the list of generated email usernames, and the generated list of domain names. In this embodiment, the email suggestor system logic generates the list of suggested email addresses ranked in the order of the probability of selection.

The email suggestor system logic may use the first name, last name and geographical information (GIS) data as inputs, implicit feedback (e.g., user click streams) and explicit feedback (e.g., a user's previous selection of suggested combinations of email usernames and domain names). The implicit feedback and explicit feedback may be obtained as a result of previous user interactions with the email suggestor system to generate a ranked list of suggested email addresses (e.g., suggested combination of email username and domain names) for user selection. The geographical information (GIS) data may include store level information (e.g., coordinates and identifies information about the business in that location). The email suggestor system output includes a ranked list of suggested usernames followed by domains. The email suggestor system may use email username generation logic to generate a list of email usernames based on the first name, last name and GIS data from a search of one or more email username and/or domain name databases. The email suggestor system and/or user email generation logic may use one or more statistical models applied to the list of email usernames to determine the probability of selection (e.g., the likelihood that the suggested email username matches the consumer's actual email username). The email suggestor system logic may use the GIS data, as well as other information about the location of the consumer, the merchant, and the interaction between the consumer and merchant, to generate a list of email domain names using, for example, approximations based on the GIS data.

The email suggestor system uses performance measurement logic to evaluate and update (e.g., train the one or more statistical models used to generate the suggested email usernames and domain names) the probabilities of selection (e.g., weights) to improve the accuracy of the suggested email usernames and domain names. The email suggestor system may update the one or more statistical models for email generation iteratively using the feedback from the user's interactions (e.g., explicit (relevance feedback) or implicit (e.g., click-stream information), or both). The email suggestor system may iteratively evaluate the performance of the generated statistical models using performance measures (e.g., Word Error Rate, Perplexity, Artificial Lattices (recognition lattices), Clustered backoff models).

Figure 4:
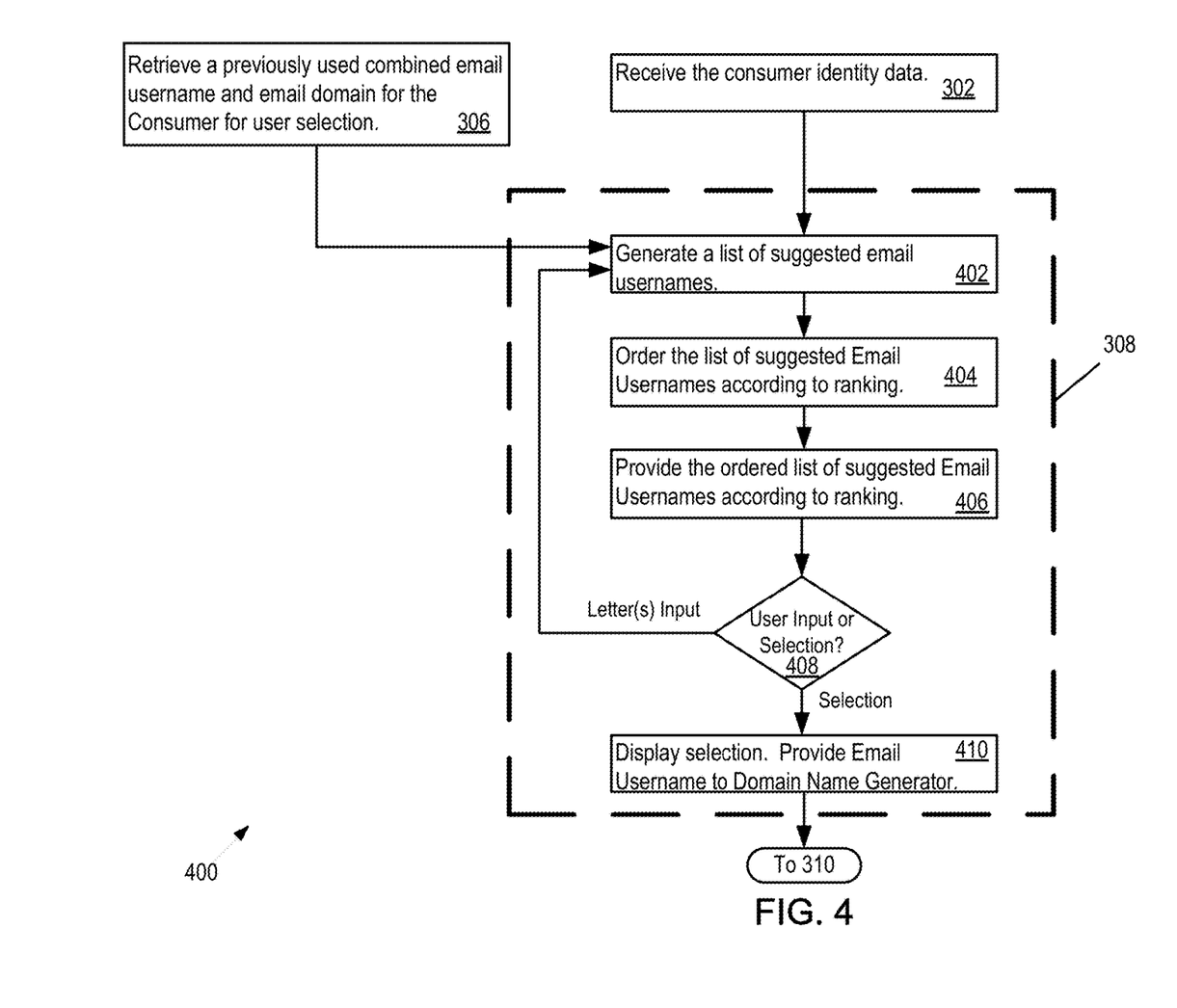
FIG. 4 shows a logic flow of an email username model used by the email suggestor system.

FIG. 4 shows a logic flow of an email username model used by the email suggestor system. The email username generator receives the consumer identity data 302. The email username generator generates an initial list of suggested email usernames (402). The list of suggested email usernames are ranked according to a probability that the email username is selected (404), and the ordered list of suggested email usernames are provided to the user (406). The user may enter additional input (e.g., one or more letters of the email username) or select from the ordered list of suggested email usernames. When the user provides additional input, the email username generator generates and updated list of suggested email usernames, and list of suggested email usernames are rank-ordered and provided to the user for selection or additional input (408). When the user selects an email username from the list of suggested email usernames, the selection is provided to the user and the email username is received by the domain name generator (410).

Figure 5:
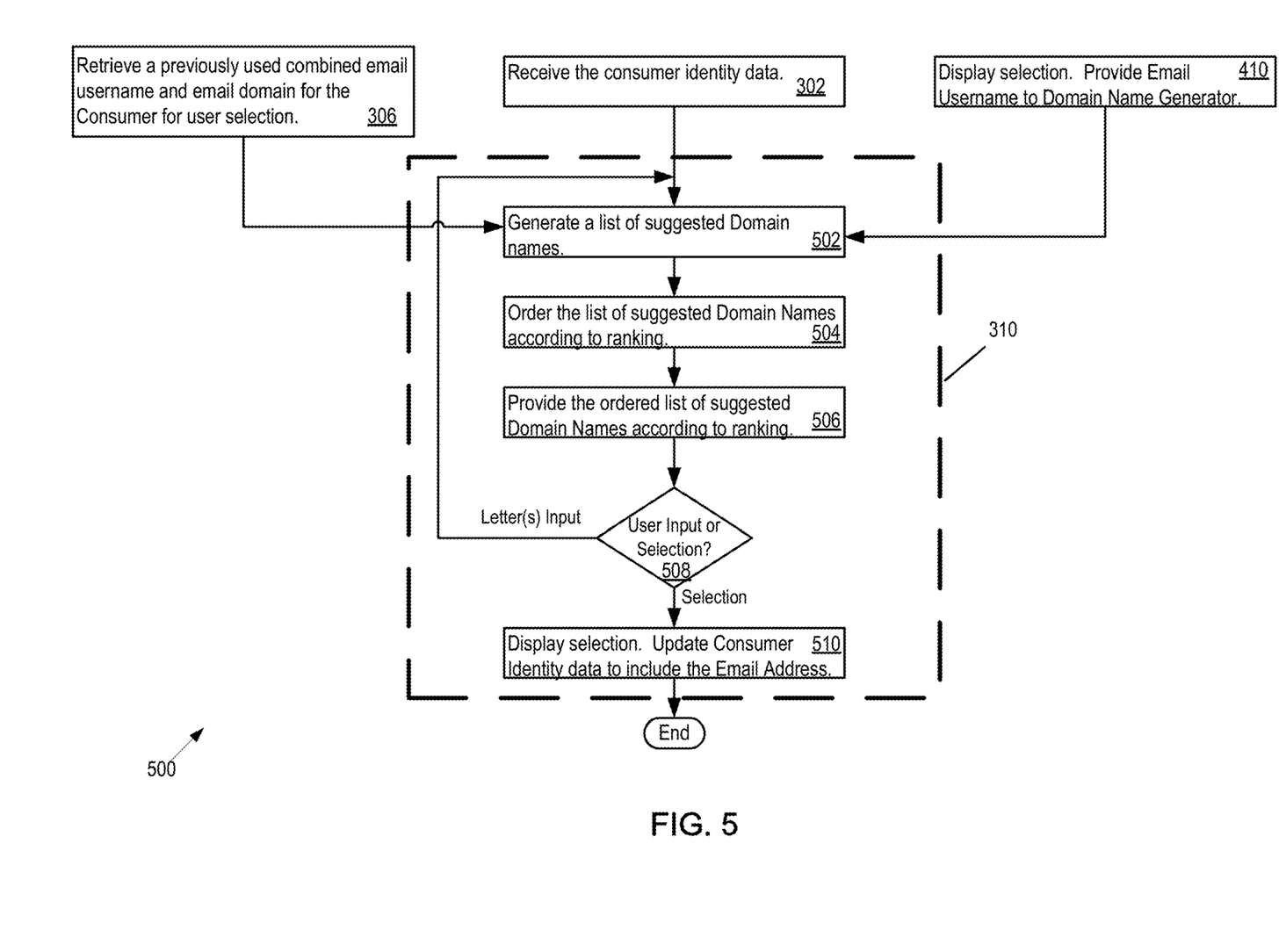
FIG. 5 shows a logic flow of a domain name model used by the email suggestor system.

FIG. 5 shows a logic flow of a domain name model used by the email suggestor system. The domain name generator receives the consumer identity data and/or the email username selection from the email username generator (302). The domain name generator generates an initial list of suggested domain names (502). The list of suggested domain names are ranked according to a probability that the domain name is selected (504), and the ordered list of suggested domain names are provided to the user (506). The user may enter additional input (e.g., one or more letters of the domain name) or select from the ordered list of suggested domain names. When the user provides additional input, the domain name generator generates and updated list of suggested domain names, and the list of suggested domain names are rank-ordered and provided to the user for selection or additional input (508). When the user selects a domain name from the list of suggested domain names, the selection is provided to the user and the consumer identity data is updated to include the email address (e.g., a string including the selected email username and selected domain name) (510).

Figure 7:
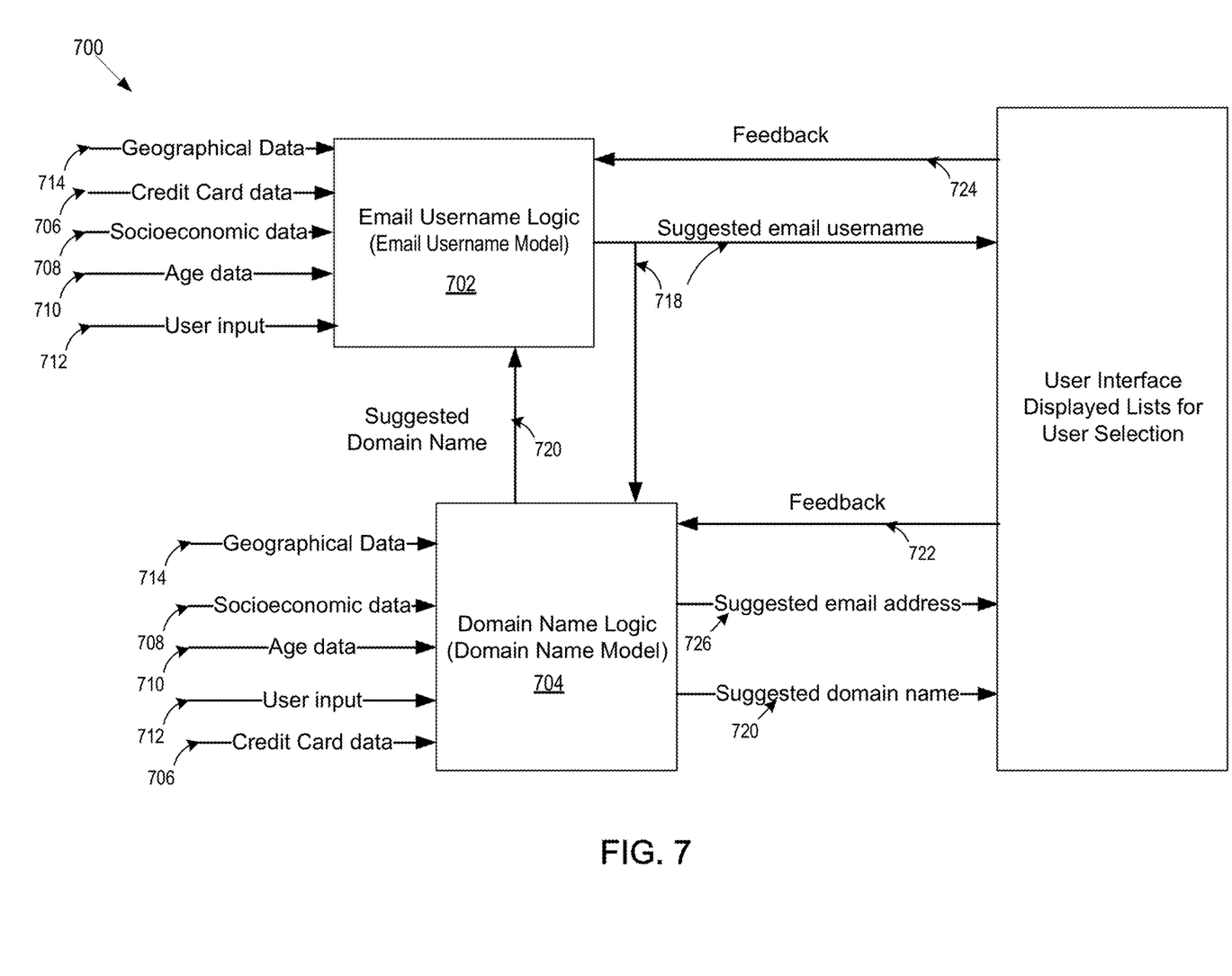
FIG. 7 shows inputs and outputs of the email usernames model and domain names model.

FIG. 7 shows inputs and outputs 700 of the email usernames model 702 and domain names model 704, and user interactions (e.g., including feedback). The email suggestor system 102 may use various data inputs including consumer identity data such as credit card 706, social economic 708, age 710, and user input 712, as well as GIS data 714. The email username logic (e.g., email usernames model 702), and the domain name logic (e.g., the domain name model 704) may both receive the various data inputs (706, 708, 710, 712, 714). The email username logic may also receive suggested domain names 716 from the domain name logic to assist in identifying suggested email usernames 718. The email username logic 702 generates suggested email usernames 718 that the domain name logic 704 uses to identify suggested domain names 720. When the user selects a suggested email username 718, the domain name logic 704 uses the email username selection (e.g., feedback 722, 724) to identify suggested email usernames and domain names combinations (e.g., email address 726). The email username logic and domain name logic are trained using feedback (722, 724) (e.g., implicit feedback such as click-streams, and explicit feedback such as user selections) to improve the accuracy of the suggested email usernames 718 and suggested domain names 720, and to therefore increase the speed with which email addresses 726 are selected.

The email suggestor system provides a way to acquire a user's email address in a retail space with minimum transaction time. The email suggestor system provides an efficient and effective way for merchants to collect and consumers to provide email addresses (e.g., email address and domain name combinations). The email suggestor system uses information about the consumer to accurately forecast and predict the consumer's email address and domain name, including information captured from a credit card number, the consumers' Groupon® profile and/or other consumer identity data. The email suggestor system reduces the amount of time the merchant spends with the consumer to accurately determine the consumer's email username and domain name, even given complicated or uncommon spellings of the consumer's first name and last name. Generally, the email suggestor system allows the user (e.g., a merchant) to acquire valuable contact information about another person (e.g., consumer) in an effective and efficient way that reduces the transaction time to do so.

The email suggestor system uses the information captured from the magnetic strip of a consumer's credit card, including the first and last name of the consumer to generate permutations of email username and domain name combinations possible for the consumer. The email suggestor system may use information available about the consumer's name and or identity in order to assist in determining the email username and domain name for the consumer. The email suggestor system may provide suggested email addresses during the process of capturing (e.g., acquiring and or entering) the consumer's contact and identity information.

In addition to the consumer contact and identity information that may be acquired from the magnetic strip from a consumer's credit card, a consumer may provide such information during a verbal conversation with a merchant. For example, when a consumer contacts a merchant by phone to place an order or reservation, the email suggestor system performs a reverse phone number lookup during the conversation to identify the consumer's name so that when the merchant requests the email address of the consumer during the call or sometime thereafter, the email suggestor system provides an ordered list of suggested email usernames and suggested domain names and assist in determining the accurate spelling of the consumer's email address. When the email suggestor system acquires a name for a consumer, the email suggestor system can forecast the email address of the consumer. In addition, whenever the email suggestor system acquires or possesses information about a consumer's identity, the email suggestor system forecasts the consumer email address and intelligent selection of the domain name.

The email suggestor system may assist a user in inputting the email address into a contact book (e.g., a database). For example, a user may enter the first and last name of a contact in a contact book, and before entering the email address of the contact, the email suggestor system may forecast the email address of the contact and suggests the email addressed to the user to expedite and minimize the transaction time to complete the contact information in the contact book.

The email suggestor system interfaces with contact, order, and payment applications and/or systems (e.g., e-commerce applications and systems) used by the merchant in order to reduce the transaction time to acquire an accurate email address for the consumer.

Identifying the username (e.g., email username) for a given domain may follow a format and/or rules established by the domain provider. For example, an organization (e.g., commercial business, school, and the University) may impose a format on the username such as first initial combined with last name (e.g., FLastname@companyABCXYZ.com). Accordingly, the email suggestor system determines whether the domain for the email username uses particular rules or formatting to more accurately forecast and or suggest to the merchant the user's email address given other consumer identity information. The email suggestor system may not know or possess the domain name for the consumer's email address before entering consumer identity information such as the first name or last name of the consumer. The email suggestor system accesses the variety of domains used by consumers that patronize the merchant using the email suggestor system, and uses the formatting and/or rules, and restrictions and/or prohibitions (e.g., valid email usernames may not include an '!'.) imposed by the respective domains to accurately determine the consumers' domain name and/or email username.

The email suggestor system may implement one or more rules to determine and/or forecast the consumer's email address. For example, the model may include rules that use location information, such as the zip code, proximity to a predetermined location (e.g., a college campus, a corporate campus, etc.), and/or other geographical information (such as GIS data) to determine the suggested username and/or domain name. More specifically, the location information may be used in conjunction with other information to generate the suggested username and/or domain name.

As another example, the email suggestor system may include rules that use various inputs, such as information that the customer is in a coffee shop within a geographically predetermined distance from a school, to decide whether to use the geographical model to forecast the probability that the domain name for the user's email address is the domain name of the school. In this way, the email suggestor system may improve the forecast of the consumer's email username given the formatting and/or rules used for the school's domain.

Likewise, the email suggestor system may include a hierarchy of rules, in which the result of a first set of rules may trigger the use of a second set of rules. For example, a determination of the domain name may dictate the rules and/or formatting for the email username of the consumer. More specifically, in the event that the rules of the email suggestor system determine within a predetermined probability that the domain is a university domain, the email suggestor system may then use a second set of rules to generate the suggested usernames (e.g., using the template for usernames for the university).

As discussed above, the email suggestor system may receive information from various sources. For example, the email suggestor system may receive the name (first and last), geographical information, and other data about the identity of the consumer and the merchant. The email suggestor system may likewise use information the merchant may already possess about consumers who have previously purchased from the merchant and/or consumers who have visited the merchant's website (e.g., information captured from cookies and foreign cookies in particular) and/or information acquired by the merchant through other interactions with the merchant. The merchant may have the consumer's contact information and email address and location information for those consumers who have previously interacted (e.g., made a purchase and/or made inquiry) with the merchant and/or affiliate merchants who use the email suggestor system. When the consumer has previously interacted with the merchant and/or affiliate merchants who use the email suggestor system, the email suggestor system identifies a one-to-one match to the consumer's previously captured identity information to identify the email address of the consumer. For example, when the email suggestor system identifies the credit card as belonging to a consumer who has previously interacted with the merchant and an affiliate merchant who also uses the email suggestor system, the email suggestor system identifies the one-to-one match to the consumer's email address and location information (e.g., geographical). Accordingly, when the email suggestor system identifies an existing profile for the consumer, where the profile identifies the name of the consumer and the consumer's credit card numbers, the email suggestor system can identify the consumers email address immediately.

The email suggestor system may also use one or more models to forecast and/or pre-compute the lists of suggested email usernames and domain names for the email suggestor system user (e.g., merchant) to select in order to minimize the transaction time needed to acquire the accurate email address of the consumer. The email suggestor system also uses the merchant selection to train the one or more models used to suggest the email usernames and domain names permutations. The suggested lists of email usernames and domain names may be ranked based on configurable rules. For example, multiple models may be employed to work in parallel to forecast the user's email address and domain name permutations, and the email suggestor system may rank the permutations according to a priority ranking of the multiple models used. For example, the email suggestor system may prioritize and/or rank multiple models and the forecasts generated by the respective models, where one model may be trained using geographical information about the consumer, while another model may be trained using the age and social economic information about the consumer, while even another model may be trained using information about the merchant in combination with the consumer's information. Depending on configurable rules, the ranking of the forecasts generated by the models may determine the sequence that suggested email usernames and domain names are listed for selection. The email suggestor system may also use a national model (e.g., trained using an aggregation of nationally captured email usernames and domains names information), a local model (e.g., trained using a subset of captured email usernames and domains names information within a configurable geographical area and/or location), and/or a hyper-local model (e.g., trained using a subset of the subset of captured email usernames and domains names information within a configurable geographical area and/or location) trained to each identify methods to accurately predict the consumer's email address and domain name.

Using performance metrics and key indicators the models are trained and the email suggestor system may prioritize the models based on the performance metrics and key indicators. The email suggestor system uses configurable sample populations of email usernames and domain names from various sources including the merchants that use the email suggestor system. For example, the email suggestor system determines the probability that the combination of the first three letters of a consumer's email address, and the first and last name from the consumer's credit card results in an accurate email address and domain name. The email suggestor system captures the selection made by the merchant regarding the email username and domain name of the consumer in order to refine and train the model used to accurately predict the email user's name and domain name.

The email suggestor system may use performance measures and key performance indicators to identify the accuracy of the forecasts of the models.

The email suggestor system identifies the email usernames and domain names the merchant has previously captured and/or stored for use. For example, the email suggestor system may determine that for a coffee shop merchant in geographical proximity to a university with low demographic diversity (e.g., a small town university in a geographically rural area and/or with low commercial diversity), there is a high probability that the email of a consumer uses a domain name from the University. In contrast, the email suggestor system may determine that for another coffee shop merchant in geographical proximity to a big city university with high demographic diversity (e.g., a university in a geographically big city and/or with high commercial diversity), there is a low probability that the email of the consumer uses a domain name from the big city university.

The email suggestor system provides an effective and efficient way to receive the captured customer identity information in various sequences or orders of delivery and/or receipt. For example, the email suggestor system may first receive, through a credit card swipe, the first and last name of the consumer, then receives character inputs entered by the merchant to identify the consumer's email username, and subsequently and/or in parallel determines the domain name for the email address given all or some portion of the consumer's email username. The email suggestor system may use the domain name to infer the structure and/or format of the consumer's email username, when the email suggestor system has aggregate information about the probability of the domain being used at the merchant's store. Moreover, the email suggestor system trains the models to detect changes in demographics for the merchants so that the priority ranking and use of one or more models changes responsive to changes in the demographics. For example, the consumers that interact with a merchant may correlate to seasonal factors (e.g., certain consumers frequent a particular merchant only during particular seasons and/or times of the year), and the email suggestor system adapts responsibly to such correlations to seasonal factors in order to accurately forecast the domain name to suggest. The email suggestor system identifies trends and changes in consumer demographics for the merchants and adapts the models accordingly to accurately forecast the consumer's email username and domain name.

The email suggestor system provides an effective and efficient way to enhance and improve the transaction time for consumer-facing operations in a retail environment. For example, when the email suggestor system captures a consumer's credit card information as a result of swiping the credit card and/or using near field technology to capture the information when the credit card is in proximity to the payment system, the email suggestor system may assist the merchant in offering rewards to the consumer by minimizing the transaction time used to capture the email address of the consumer.

The email suggestor system also may be used by the user (e.g., merchant) in transactions with the consumer that do that involve payment. For example, in a checkout interaction between the consumer and the merchant that does not involve payment, where the consumer's payment information is already on file with the merchant, the merchant may use the email suggestor system to generate a form that accurately includes the consumer's identity information including the email address and domain name so that the consumer may merely add a response requested by the merchant (e.g., how did you like our service?), rather than the consumer having to provide the identity information including the email username and domain name. The email suggestor system may be used by a merchant wherever the merchant is collecting identity information to assist in minimizing the transaction time to complete the capture of the consumer's email username and domain name.

The email suggestor system provides merchants a way to efficiently and effectively capture email username and domain name information. Consider an example where a consumer calls (e.g., during a face-to-face verbal data capture transaction) to rent a car from a merchant. The merchant may ask whether the consumer would like an email receipt for the car rental so that the consumer may retrieve the receipt from the consumer's mobile device. Currently, the consumer must spell out the consumer's email username and domain names to the merchant. However, using the email suggestor system, the merchant is able to suggest the email username and domain name to the consumer based on the first few letters of the consumer's name (e.g., in particular reducing the transaction time for complicated consumer names and/or uncommonly used names, including complex and uncommonly used domain names).

The system 102 may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor, such as a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed here and in the claims below may be embodied in and implemented in one or multiple physical chips or circuit combinations. The processor may execute a software program, such as code generated manually (i.e., programmed).

The computer system may include a memory that can communicate via a bus. The memory may be a main memory, a static memory, or a dynamic memory. The memory may include, but may not be limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system (e.g., a computer program product comprising a non-transitory computer-readable storage medium). Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An email suggestor system for interfacing each of two or more affiliate merchant devices including at least a first merchant device and a second merchant device, with a contact, order, or payment application to reduce a transaction time for consumer-facing operations, the email suggestor system comprising an apparatus, the apparatus comprising at least one processor and at least one memory including program code, the at least one memory and the computer program code configured to, with the at least one processor, cause the apparatus to:
    receive, at the first merchant device, during a first transaction, from a consumer device, first identity information and an associated payment information;
    store the first identity information and the associated payment information;
    subsequent to the first transaction, receive, during a second transaction, at the second merchant device, second identity information;
    perform, utilizing the second identify information, a one-to-one match to previously captured identity information;
    identify a one-to-one match between at least a portion of the second identity information received during the second transaction to at least a portion of the first identity information received during the first transaction;
    determine, during the second transaction at the second merchant device, the associated payment information based on identifying the one-to-one match;
    identify an associated email address associated with the associated payment information;
    provide, during the second transaction, an interface to a contact, order, or payment application; and
    cause, during the second transaction, display of the associated email address associated with the associated payment information at the interface to the contact, order, or payment application.

2. The email suggestor system according to claim 1, wherein the consumer device is a credit card and the first identity information is received via credit card swipe.

3. The email suggestor system according to claim 1, wherein the consumer device is a credit card and the first identity information is received via near field communication.

4. The email suggestor system according to claim 1, wherein the receiving of the second identity information during the second transaction comprises:
    identifying a phone number from which contact was made; and wherein the performing of the one-to-one match comprises:
    performing a reverse phone number look-up.

5. The email suggestor system according to claim 1, wherein the first identity information is at least one of a first name and last name of a consumer or a phone number.

6. The email suggestor system according to claim 1, wherein the receiving of the second identity information during the second transaction comprises:
    using near field communication technology to capture at least a portion of the second identity information from a credit card when the credit card is in proximity to the second device,
    wherein the causing display, during the second transaction, of the email address associated with the associated payment information comprises:
    identifying an existing profile for the consumer utilizing the second identity information, where the profile identifies the associated payment information.

7. The email suggestor system according to claim 1, wherein the second information is at least one of a first name and a last name of a consumer or a phone number.

8. A email suggestor computer program product for interfacing each of two or more affiliate merchant devices including at least a first merchant device and a second merchant device, with a contact, order, or payment application to reduce a transaction time for consumer-facing operations, the computer program product comprising at least one non-transitory computer-readable storage medium having computer-executable program code instructions stored therein, the computer-executable program code instructions comprising program code instructions for:
    receiving, at the first merchant device, during a first transaction, from a consumer device, first identity information and an associated payment information;
    storing the first identity information and the associated payment information;
    subsequent to the first transaction, receiving, during a second transaction, at the second merchant device, second identity information;

performing, utilizing the second identify information, a one-to-one match to previously captured identity information;

identifying a one-to-one match between at least a portion of the second identity information received during the second transaction to at least a portion of the first identity information received during the first transaction;

determining, during the second transaction at the second merchant device, the associated payment information based on identifying the one-to-one match;

identifying an associated email address associated with the associated payment information;

providing, during the second transaction, an interface to a contact, order, or payment application; and causing, during the second transaction, display of the associated email address associated with the associated payment information at the interface to the contact, order, or payment application.

9. The computer program product according to claim 8, wherein the consumer device is a credit card and the first identity information is received via credit card swipe.

10. The computer program product according to claim 8, wherein the consumer device is a credit card and the first identity information is received via near field communication.

11. The computer program product according to claim 8, wherein the receiving of the second identity information during the second transaction comprises:

identifying a phone number from which contact was made; and wherein the performing of the one-to-one match comprises:

performing a reverse phone number look-up.

12. The computer program product according to claim 8, wherein the first identity information is at least one of a first name and last name of a consumer or a phone number.

13. The computer program product according to claim 8, wherein the receiving of the second identity information during the second transaction comprises:

using near field communication technology to capture at least a portion of the second identity information from a credit card when the credit card is in proximity to the second device, wherein the causing display, during the second transaction, of the email address associated with the associated payment information comprises:

identifying an existing profile for the consumer utilizing the second identity information, where the profile identifies the associated payment information.

14. The computer program product according to claim 8, wherein the second information is at least one of a first name and a last name of a consumer or a phone number.

15. A computer-implemented method for programmatically for interfacing each of two or more affiliate merchant devices including at least a first merchant device and a second merchant device, with a contact, order, or payment application to reduce a transaction time for consumer-facing operations, the computer-implemented method comprising:

receiving, at the first merchant device, during a first transaction, from a consumer device, first identity information and an associated payment information;

storing the first identity information and the associated payment information;

subsequent to the first transaction, receiving, during a second transaction, at the second merchant device, second identity information;

performing, utilizing the second identify information, a one-to-one match to previously captured identity information;

identifying a one-to-one match between at least a portion of the second identity information received during the second transaction to at least a portion of the first identity information received during the first transaction;

determining, during the second transaction at the second merchant device, the associated payment information based on identifying the one-to-one match;

identifying an associated email address associated with the associated payment information;

providing, during the second transaction, an interface to a contact, order, or payment application; and causing, during the second transaction, display of the associated email address associated with the associated payment information at the interface to the contact, order, or payment application.

16. The computer-implemented method according to claim 15, wherein the consumer device is a credit card and the first identity information is received via credit card swipe.

17. The computer-implemented method according to claim 15, wherein the consumer device is a credit card and the first identity information is received via near field communication.

18. The computer-implemented method according to claim 15, wherein the receiving of the second identity information during the second transaction comprises:

identifying a phone number from which contact was made; and wherein the performing of the one-to-one match comprises:

performing a reverse phone number look-up.

19. The computer-implemented method according to claim 15, wherein the first identity information is at least one of a first name and last name of a consumer or a phone number.

20. The computer-implemented method according to claim 15, wherein the receiving of the second identity information during the second transaction comprises:

using near field communication technology to capture at least a portion of the second identity information from a credit card when the credit card is in proximity to the second device, wherein the causing display, during the second transaction, of the email address associated with the associated payment information comprises:

identifying an existing profile for the consumer utilizing the second identity information, where the profile identifies the associated payment information.

21. The computer-implemented method according to claim 15, wherein the second information is at least one of a first name and a last name of a consumer or a phone number.

* * * * *